United States Patent [19]

Turton et al.

[11] 4,425,793
[45] Jan. 17, 1984

[54] LEVEL GAUGING SYSTEMS

[75] Inventors: David Turton; Lionel R. F. Thompson, both of Hatfield, England

[73] Assignee: Hawker Siddeley Dynamics Engineering Limited, Hatfield, England

[21] Appl. No.: 266,869

[22] Filed: May 26, 1981

[30] Foreign Application Priority Data

May 29, 1980 [GB] United Kingdom ................ 8017506

[51] Int. Cl.³ ............................................. G01F 23/28
[52] U.S. Cl. .................................. 73/290 R; 343/7.7
[58] Field of Search ............. 73/290 R, 304 C, 304 R; 324/58.5; 343/7.7

[56] References Cited

U.S. PATENT DOCUMENTS

| | | | |
|---|---|---|---|
| 3,184,969 | 5/1965 | Bolton | 73/290 V |
| 3,812,422 | 5/1974 | De Carolis | 324/58.5 B |
| 3,893,109 | 7/1975 | Chiron et al. | 343/7.7 |
| 3,995,212 | 11/1976 | Ross | 324/58.5 B |

FOREIGN PATENT DOCUMENTS

| | | | |
|---|---|---|---|
| 2161682 | 1/1973 | Fed. Rep. of Germany | 73/290 R |
| 2020507 | 11/1979 | United Kingdom | |
| 632910 | 11/1978 | U.S.S.R. | 73/290 R |

OTHER PUBLICATIONS

S. S. Stuchley et al., Surface-Level Microwave Monitor, in Design Electronics Monographs: Microwaves in Industry, pp. 15-34, London England (1971).

*Primary Examiner*—S. Clement Swisher
*Attorney, Agent, or Firm*—Howard L. Rose

[57] ABSTRACT

To measure the height of the surface of a fluent material, such as coal, in a bunker or container, pulsed radiation from a microwave source is beamed down on to said surface, and the return radiation reflected from the surface is processed to detect pulses in the waveform with time-varying amplitudes, and therefore denoting returns from the fluent material, and to reject fixed shape pulses denoting returns from the fixed structure of the bunker. To discriminate between returns of time-varying amplitude (i) from the fluent material surface and (ii) from material flowing in from an in-feed, the higher frequency components, denoting the material flowing in, are filtered out.

12 Claims, 3 Drawing Figures

LEVEL GAUGING SYSTEMS

This invention is concerned with a method and apparatus for the measurement of the height of a material, which may be fluid, granular or a slurry, in a container. It is particularly, though not exclusively, related to equipment for the measurement of the amount of coal in vertical storage bunkers, but the apparatus will also be applicable to other storage systems for coal or other materials where the principles employed by the measuring apparatus are similar.

Many attempts have been made to devise a reliable system to determine the level of coal in storage bunkers. These bunkers have different shapes and sizes. Surface bunkers can be divided into three categories, the first rectangular, 5 meters long by 5 meters wide by 15 meters deep, the second circular, 8 meters diameter and 30 meters deep; the third rectangular, 10 meters by 10 meters by 30 meters deep. Another category is underground staple shaft bunkers where the diameter is in the region of 8-9 meters, and these can be from 50 to 100 meters deep.

Most physical phenomena have been employed in one way or another to obtain a gauging of the level of the surface of the coal in the bunker or, alternatively, to gauge the volume of coal stored. All methods used commonly to date have serious shortcomings and many methods have proved to be quite unusable.

Our investigations have shown that the known problems can be overcome by the use of a high resolution pulsed radar system.

According to the present invention, there is provided a method for measuring the height of a fluent material in a container or bunker, wherein pulsed radiation from a microwave source is projected down on to the material surface and the return radiation reflected from the surface is processed to detect pulses in the waveform that display time-varying amplitudes denoting returns from the flowing surface and to reject pulses of fixed shape denoting returns from fixed parts of the bunker structure.

The invention further provides apparatus for performing the above method, comprising a microwave source of pulsed radiation adapted to be mounted above or at the top of the container or bunker to project said radiation down on to the surface of the fluent material in the container or bunker, means for receiving return radiation reflected from said surface, and means for detecting in the return radiation waveform pulses that display time-varying amplitudes denoting returns from the flowing surface and for rejecting pulses of fixed shape denoting returns from fixed parts of the bunker structure.

The apparatus according to the invention does not have lineariser problems or range side lobe problems and the ambiguities inherent in FMCW systems are avoided, whilst the equipment is capable of operating at IS power levels. It was recognised that even with a pulsed system the reflections from the structure of a bunker could cause ambiguities. It is observed that one unique characteristic that can be employed to eliminate the majority of ambiguities is the movement of the coal itself. In a bunker it is only coal that is moving. There is the coal falling in from the in-feed and there are the movements of the surface of the coal level in the bunker when the bunker is either filling or emptying. The detection of this movement eliminates substantially completely the problems associated with obstructions that made the use of FMCW systems impracticable. The design of the apparatus is such that the necessary discrimination between the two movements of coal is provided, the signals due to the falling of the coal from the in-feed being eliminated and the signals from the moving surface being retained to be indicative of the coal level.

Trials have shown that there is a significant difference in the audio frequency components of the radar return. That from coal pouring in from the in-feed is significantly higher than the frequency generated by the surface movement. This characteristic makes the surface return readily and unambiguously detectable.

Arrangements according to the invention will now be described by way of example with reference to the accompanying drawings, in which.

Figure 3:
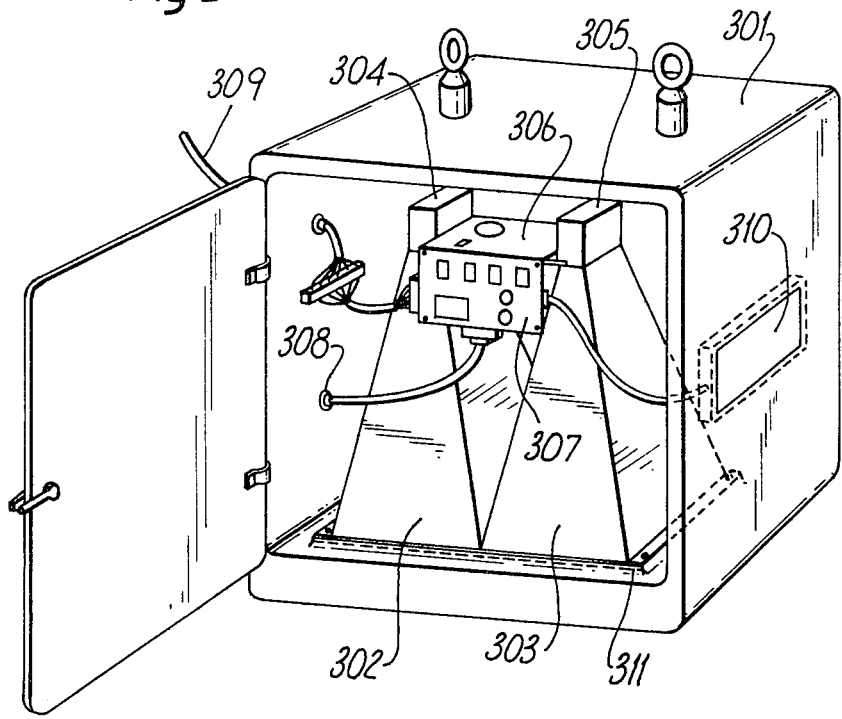

FIG. 3 gives an example in outline form of a particular construction for the apparatus. It is to be understood that these figures are diagrammatic only and indicative of one type of assembly associated with the invention.

Figure 1:
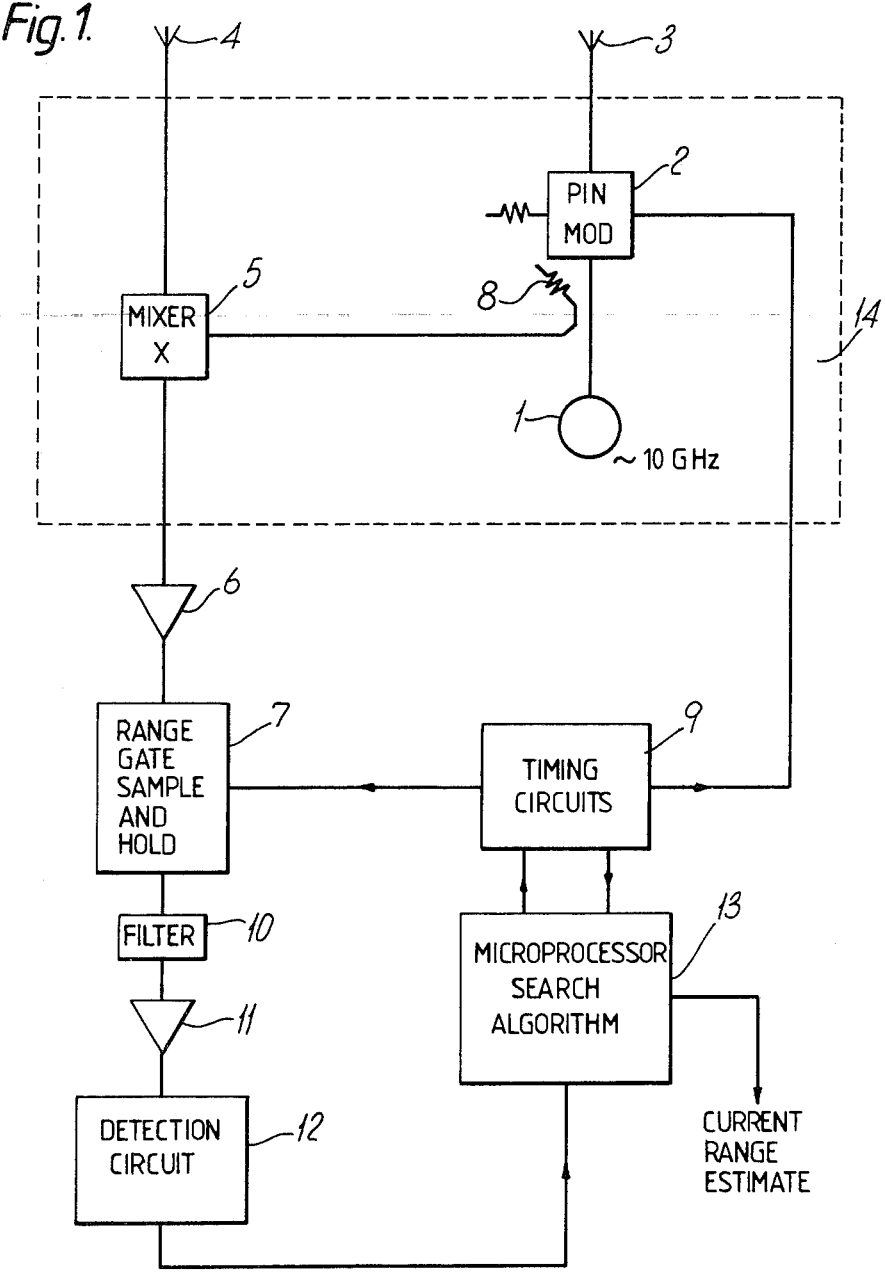
FIG. 1 shows a simplified block diagram of the apparatus showing the essential parts of the system for it to operate according to the invention.

Referring to FIG. 1, there is a microwave source comprising a gun oscillator 1 which is connected via a PIN modulator 2 to a transmitting horn aerial 3. Reflected radiation from the surface of the bunker is collected by the receiving horn aerial 4 and fed via the mixer crystal 5 to a video amplifier 6. A small sample of the radiated signal is picked up in the vicinity of the microwave source in the coupler 8 and fed also to the mixer crystal 5.

The microwave components may be contained in an integrated circuit 14 in order to minimise the cost and size of the assembly.

The output from the video amplifier 6 is connected into the range gate sample and hold network 7 where the return pulse is compared with the transmitted pulse by reference to the timing circuits 9. The signal from the range gate sample and hold circuit is connected to the filter 10 where the unwanted returns are attenuated. The signal containing the range information is passed via the audio amplifier 11 to the detection circuit 12 where it is conditioned to feed into the microprocessor unit 13. Signals are also fed to the microprocessor unit from the timing circuits 9 and signals from the microprocessor unit 13 are connected to the timing circuits 9. Software is employed in the microprocessor unit such that a suitable search algorithm is constructed. The output from the microprocessor unit 13 contains the current range estimate of the surface of the coal in the bunker and can be used as an output to a control system or to a visual indicator.

Figure 2:
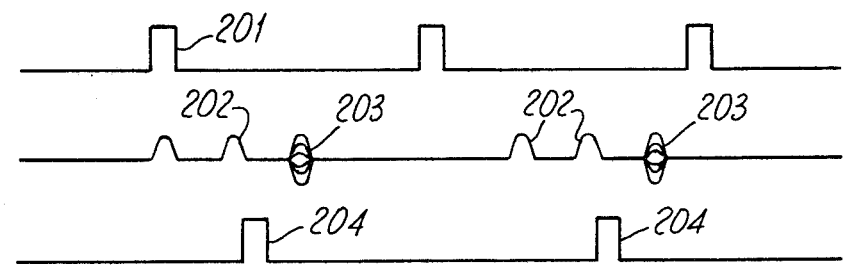
FIG. 2 shows some idealised waveforms which are obtained when the apparatus is used in conjunction with a bunker wherein the surface to be gauged is moving.

The waveforms which are shown in an idealised form in FIG. 2 illustrate the principle features of the invention from the point of view of signal shapes. Pulses 201 at microwave frequency are transmitted intermittently from the horn aerial transmitter 3. The mixed signal from the mixer crystal 5 takes on the shape of the pulses shown in the video return waveform 202 and 203. It will be noted that the video return signals 202 from stationary objects take on clean shapes which are not varying with time whereas video returns 203 from moving targets are seen to contain variable amplitudes with respect to time. The low frequency component contained within the video returns for the moving target is indicative of the type of target. The video returns are strobed by the sample gate signals illustrated at 204.

FIG. 3 shows diagrammatically one embodiment of the invention in a practical form. The enclosure 301 contains two microwave horns 302 and 303. It is to be noted that in other embodiments two such horns may be replaced by a single horn or dish which serves the purposes of both transmitter and receiver in association with a re-circulating element. Associated with the horns are two wave guides 304 and 305 which are coupled to the microwave integrated circuit 306. All the associated electronic circuitry for the processing of the signals and providing the particular power lines for the network are incorporated in the processing unit 307. The total power supply requirements of the unit are such that it can be constructed to conform with intrinsic safety regulations. In principle this implies that the voltage levels within the unit are low and the current consumption is also low. Furthermore, none of the equipment contains inductances or capacitances of more than certain levels which are computable from the IS regulation specifications. Power is supplied to the input via the connector 308 from a suitably approved IS power supply. The output signal from the unit is taken from connector 309. Additionally, a local display 310 of the distance of the target surface can be given on a visual unit conveniently disposed on the surface of the container 301. The horns are connected at the edges to the steel enclosure in which are cut apertures to allow both the transmitted and the received microwave signals to leave and enter the equipment. In order to prevent dust or other foreign material entering the enclosure the apertures are covered by a microwave transparent cover, typically a polycarbonate sheet 311.

In a design of an equipment generally similar to that shown in the drawings, the system generates a 30 nanosecond pulse ($30 \times 10^{-9}$ seconds) which is equivalent to a range of 10 meters. The pulse repetition rate of the system is so chosen to allow for a possible range of the furthest distance target of 200 meters.

A facility is provided to display the return signal with the ability to select any desired time interval from the initiation of a pulse. This time interval can be displayed in such a way that it is translated into meters distance. A typical method of display of this range is the use of a liquid crystal display. The selected distance can also give a bright-up portion on the display enabling a range of any return of interest to be immediately indicated. Practical demonstrations of the operation of the equipment show that it operates distinctly well and unambiguously up to a range of 200 meters.

An additional feature of the equipment, which is operational, is the facility to take a signal output from the audio amplifier into a pair of headphones. This especially is of considerable value in characterising the nature of the surface producing the return signal. Experience has shown that different moving surfaces have unambiguous signatures. For example, coal falling into the bunker from the in-feed contains many high frequency sound components whereas the returns from the surface of the coal contain components which give rise to a low frequency rumble.

The equipment, according to the invention, has been tested satisfactorily on a 16 meter bunker and 30 meter bunker both when emptying and filling. Bunkers with both internal spiral chutes and chutes for free fall have been measured satisfactorily.

I claim:

1. A method for measuring the height of a fluent material in a container or bunker, wherein pulsed radiation from a microwave source is projected down on to the material surface and the return radiation reflected from the surface is processed to detect pulses in the waveform that display time-varying amplitudes denoting returns from the flowing surface and to reject pulses of fixed shape denoting returns from fixed parts of the bunker structure.

2. A method according to claim 1, wherein the return radiation is processed to distinguish lower frequency components in the waveform indicative of surface movement from higher frequency components indicative of material pouring in from an in-feed, and to eliminate the higher frequency components.

3. Apparatus for measuring the height of a fluent material in a container or bunker, the apparatus comprising:
   a microwave source of pulsed radiation adapted to be mounted above or at the top of the container or bunker to project said radiation down on to the surface of the fluent material in the container or bunker;
   means for receiving return radiation reflected from said surface; and
   means for detecting in the return radiation waveform pulses that display time-varying amplitudes denoting returns from the flowing surface and for rejecting pulses of fixed shape denoting returns from fixed parts of the bunker structure.

4. Apparatus according to claim 3, comprising means for processing the return radiation to distinguish low frequency components in the waveform indicative of surface movement from higher frequency components indicative of material pouring in from an in-feed, and to eliminate said higher frequency components.

5. Apparatus according to claim 3 or claim 4, wherein the microwave source comprises a gun oscillator, a PIN modulator and a transmitting horn aerial.

6. Apparatus according to claim 5, wherein a coupler picks up a small sample of the radiated signal in the vicinity of the microwave source and feeds it to the mixer crystal.

7. Apparatus according to claim 6 further comprising the range gate sample and hold network to receive the output of the video amplifier, a filter to receive the output of the range gate sample and hold network and attenuating unwanted frequencies in the return waveform, an audio amplifier receiving the filter output, and a detection circuit receiving the output of the audio amplifier.

8. Apparatus according to claim 3 or claim 4, wherein the receiving means comprises a receiving horn aerial, a mixer crystal and a video amplifier.

9. Apparatus according to claim 8 further comprising a range gate sample and hold network to receive the output of the video amplifier, a filter to receive the output of the range gate sample and hold network and attenuating unwanted frequencies in the return waveform, an audio amplifier receiving the filter output, and a detection circuit receiving the output of the audio amplifier.

10. Apparatus according to claim 9, further comprising a microprocessor receiving the output of the detection circuit and delivering an output signal representative of the range of the fluent material surface below the aerials.

11. Apparatus according to claim 10 further comprising timing circuits coupled to the microprocessor and delivering outputs to the PIN modulator and the range gate sample and hold network.

12. Apparatus according to claim 8 wherein a coupler picks up a small sample of the radiated signal in the vicinity of the microwave source and feeds it to the mixer crystal.

* * * * *